United States Patent [19]

Deflandre

[11] 4,020,537

[45] May 3, 1977

[54] HEAD-STOCK FOR A MILLING AND BORING MACHINE

[76] Inventor: René Deflandre, 6, rue Alfred Dehodencq, 75016 Paris, France

[22] Filed: Jan. 21, 1975

[21] Appl. No.: 542,720

[30] Foreign Application Priority Data

Jan. 22, 1974  France .............................. 74.02127

[52] U.S. Cl. .............................. 29/26 A; 90/11 R; 90/17; 408/239 A
[51] Int. Cl.² ...................... B23Q 5/20; B23B 39/02
[58] Field of Search ......... 90/11 A, 11 R, 17, 11 E, 90/57, DIG. 22; 408/239, 239 A, 133, 35; 29/26 A; 51/165.72

[56] References Cited

UNITED STATES PATENTS

| | | | |
|---|---|---|---|
| 2,345,060 | 3/1944 | Morton | 408/133 |
| 2,386,145 | 10/1945 | Ruysdael | 90/57 |
| 2,956,454 | 10/1960 | Hansen | 408/35 X |
| 3,173,315 | 3/1965 | Fuldner et al. | 408/35 X |
| 3,748,965 | 7/1973 | Galbarini et al. | 90/17 |
| 3,757,637 | 9/1973 | Eich et al. | 90/17 |

Primary Examiner—Othell M. Simpson
Assistant Examiner—Z. R. Bilinsky
Attorney, Agent, or Firm—Lewis H. Eslinger

[57] ABSTRACT

This invention relates to a head-stock for a milling and boring machine, comprising a body in which a boring spindle and a milling sleeve or spindle arranged around the boring spindle are mounted to rotate, wherein a tubular member is mounted to rotate around the milling sleeve or spindle to which tubular member is secured a ring which is of large diameter and which is situated in the front face of the body, said ring being capable of being connected selectively to means for driving it round at high speed for machining purposes and to means for driving it round at slow speed for indexing purposes.

9 Claims, 12 Drawing Figures

HEAD-STOCK FOR A MILLING AND BORING MACHINE

The present invention relates to head-stocks for milling and boring machines.

Fixed head stocks or head-stocks which are movable along the axis of the spindle are known for milling and boring machines which incorporate, in addition to the conventional drive sleeve or milling spindle and boring spindle, a tubular member which forms a support for a built-in or detachable surfacing plate.

The tubular member is driven by its own kinematic train which enables it to rotate at speeds slower than those of the milling sleeve or spindle so that workpieces of large diameter can be handled.

Machining heads may be mounted on the front face of the head-stock by means of supports the shape and size of which vary depending on whether they overlap the surfacing plate and whether or not the latter is removable.

Since the supports have an entirely manual or motorised arrangement for turning and locking the machining head or reading off its position and clamping it in place, the result is that the time taken by the operation in question is considerable, since to turn the head it is necessary to carry out a multitude of operations consisting in releasing the fixing nuts, for the head, operating the rotating crank, finding the desired angular position using a vernier, or a locating bolt, or an optical device, and finally in tightening the fixing nuts down again on the support.

This operation becomes more awkward and requires more effort the greater the weight and overhang of the head. The result is that the turning motion takes place in jerks due to the increase in friction, which make it difficult to set the required angular position with accuracy, this causes the re-setting time to be even longer.

It is an object of the present invention to overcome or substantially reduce the above mentioned disadvantages providing an improved headstock for a milling boring machine, incorporating a fully automatic indexing arrangement which enables high accuracy to be achieved in a very short re-setting time.

The invention consists in a head-stock for a milling and boring machine, comprising a body in which a boring spindle and a milling sleeve or spindle arranged around the boring spindle are mounted to rotate, characterised in that a tubular member is mounted to rotate around the milling sleeve or spindle to which tubular member is secured a ring which is of larger diameter and which is situated in the front face of the body, said ring being capable of being connected selectively to means for driving it round at high speed for machining purposes and to means for driving it round at slow speed for indexing purposes.

The range over which the speed of rotation of the means for driving the ring for indexing purposes extends is very wide and at the minimum speed the means allow very fine adjustments to be made and automatic stops to be made with great accuracy.

In accordance with a preferred embodiment of the invention, the ring is provided with centering and fixing means which allow either a machining head or a surfacing plate to be attached.

The slow rotary movement of the ring may be used to carry out circular machining operations by means of a spindle-carrier the axis of rotation of which is parallel to that of the ring. When such a spindle-carrier is arranged in certain angular positions, it increases the horizontal and vertical reach of the machine to an appreciable extent.

The invention will now be described, by way of example, with reference to the accompanying drawings, in which:

FIG. 8 is an elevation view of the headstock showing the ring with a surfacing plate fitted to it.

Referring to FIGS. 1 to 4 there is shown a milling and boring machine head-stock comprising a body 73 in which is mounted a support member 74 which is attached to the body by means of screws 75 and in which a tubular member 10 is rotatably mounted by means of bearings 10a, 10b.

Figure 1:
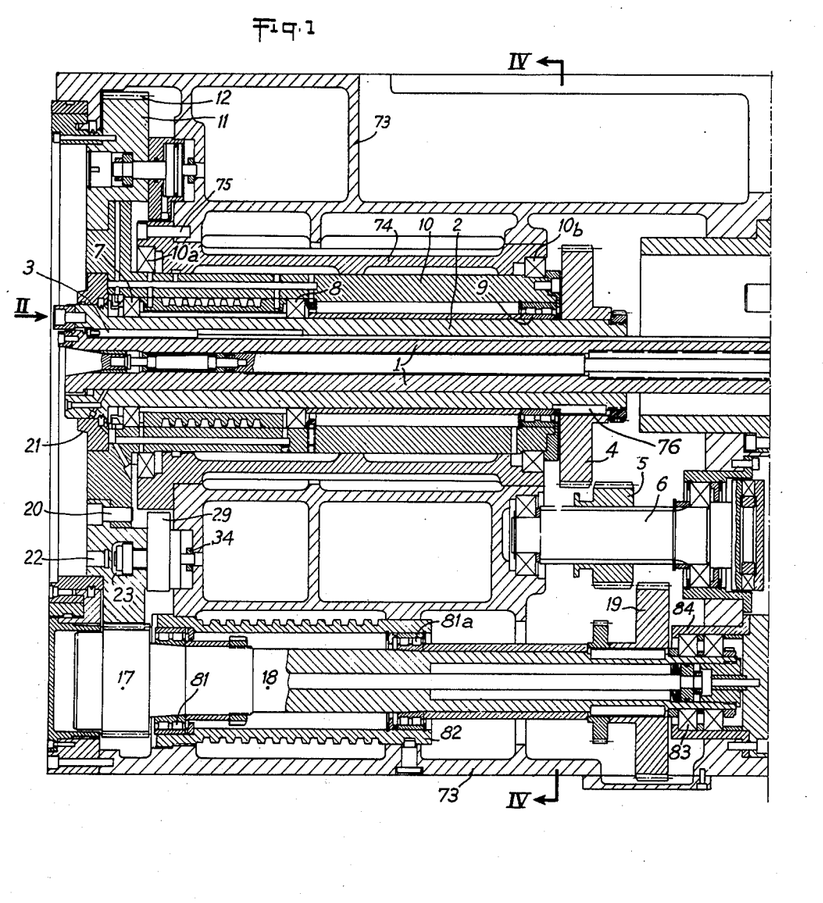
FIG. 1 is a vertical cross-section, taken through the axes of the spindles, of the front part of a fixed milling and boring machine headstock constructed in accordance with this invention.

A milling spindle or sleeve 2 is rotatably mounted inside the tubular member 10 by means of bearings 7, 8, 9 and a boring spindle 1 is mounted to slide in and axially of the sleeve 2, by which it is driven round and to which it is connected by a spline 3.

At one of its ends the milling spindle or sleeve 2 carries a gear 4 to which it is secured in rotation by a key 76. The pinion 4 is capable of meshing with a sliding pinion 5 which is connected to a splined shaft 6 coupled to a known gear-box and drive-motor which are not shown in the drawing.

Figure 3:
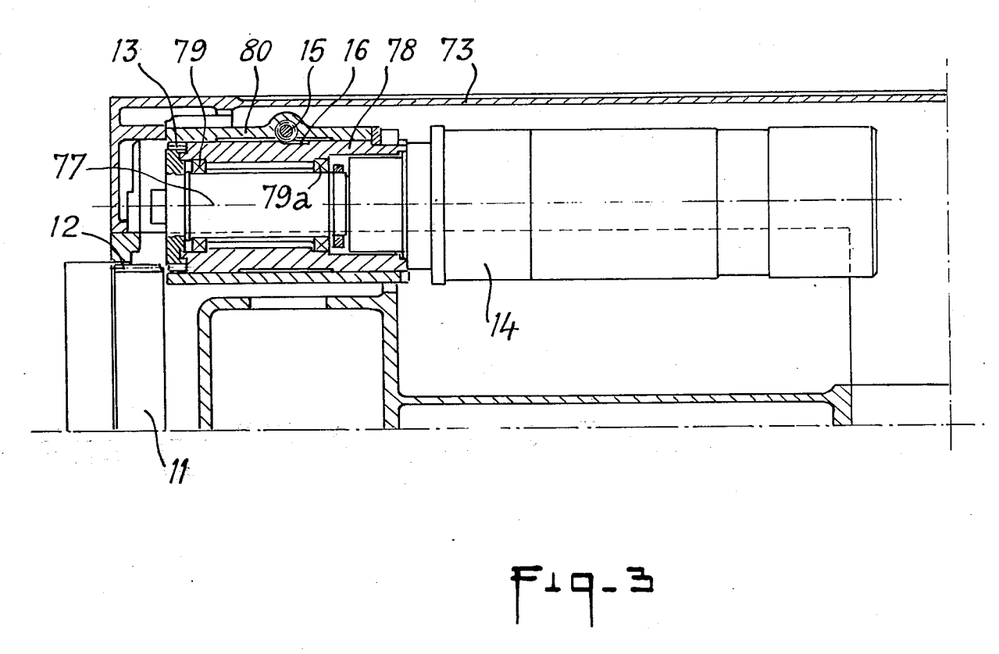
FIG. 3 is a partial cross-section taken along line III—III of FIG. 2.
Figure 4:
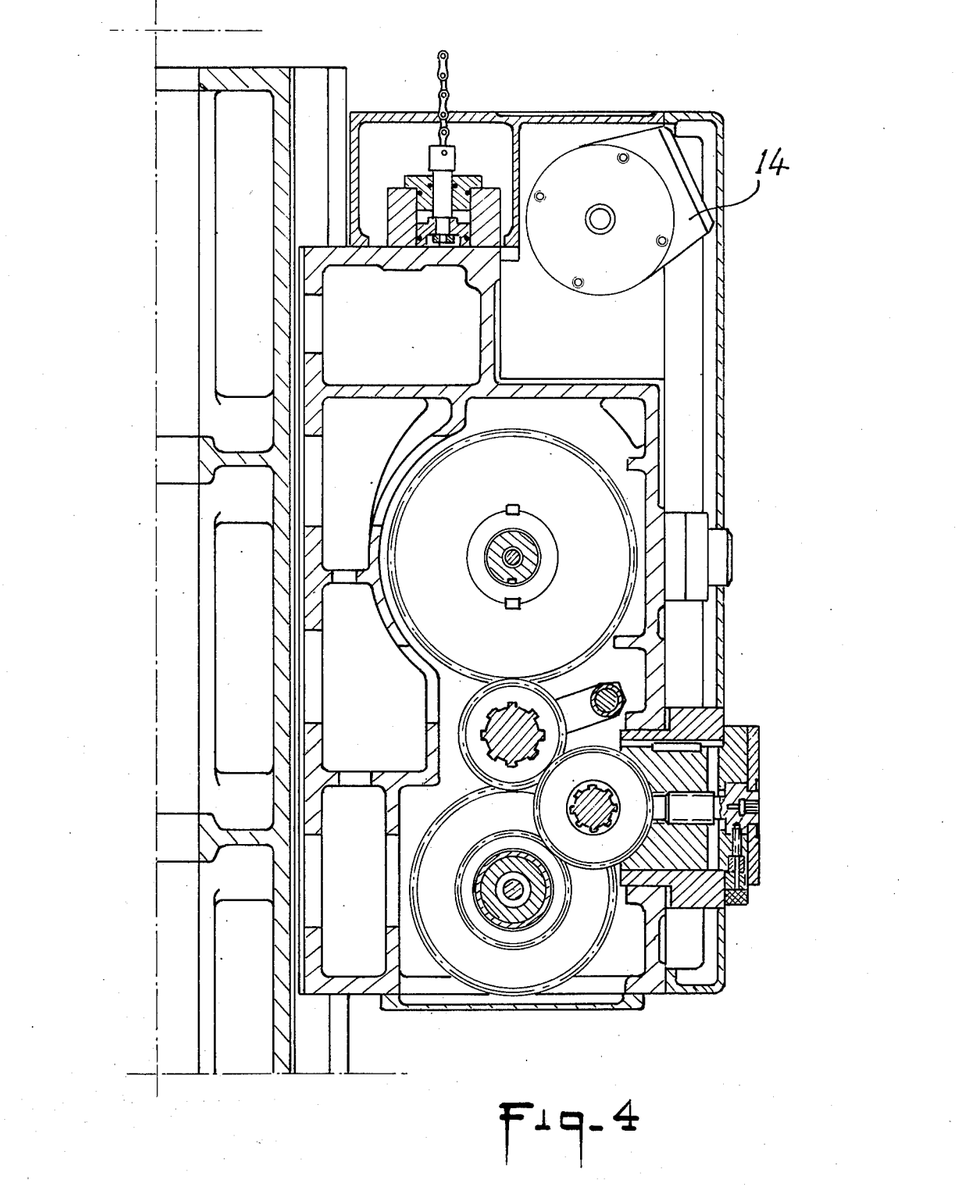
FIG. 4 is a sectional view taken along line IV—IV of FIG. 1.

On the front face of the tubular member 10 is mounted, in accordance with the invention, a ring 11 which is attached to the said member 10 by means of screws 20 and which carries a ring of teeth 12 capable of meshing with a pinion 13 (FIGS. 3 and 4). The pinion 13 is secured to a shaft 77 which is driven round by a reduction motor 14 fixed to a sleeve 78 in which shaft 77 is carried by means of bearings 79, 79a. Sleeve 78, which is mounted to slide in a holder 80 attached to the body, has a rack 16 in mesh with a pinion 15 which is rotatably mounted in the holder 80 and which is operated manually in order to move sleeve 78 and pinion 13 longitudinally so as to couple or uncouple the pinion to or from the ring of teeth 12 on ring 11.

The ring 11 may also be driven, in a conventional way, by a pinion 17 which meshes with the ring of teeth 12. The pinion 17 is keyed to a shaft 18 which is rotatably mounted by means of bearings 81,81a, in a housing 82 secured to the body of the head-stock, and by means of bearings 83 mounted in a socket 84 secured to the body 73. To one end of shaft 18 is keyed a pinion 19 which is able to be coupled to the sliding pinon 5 in order to drive the ring 11 from shaft 6, which latter is coupled to the gear-box and motor used to drive the spindles 1 and 2 of the head-stock.

Figure 1A:
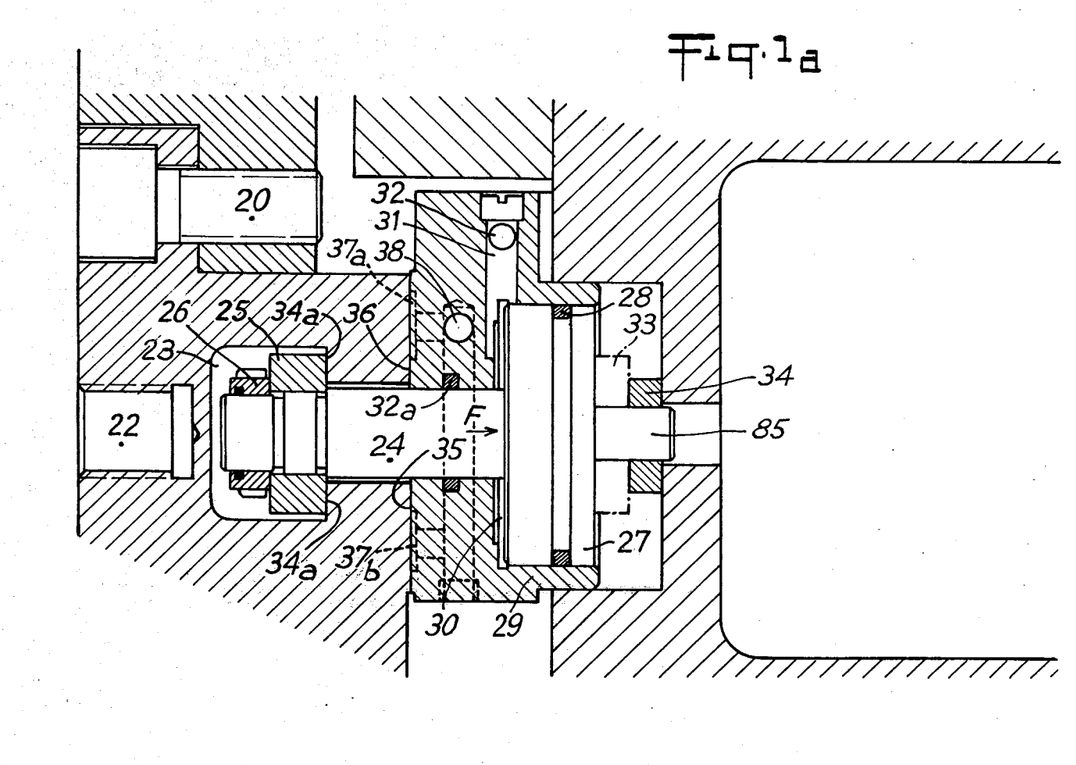
FIG. 1a is a view to a larger scale showing means for clamping the large-diameter ring to the body of the head stock.
Figure 2:
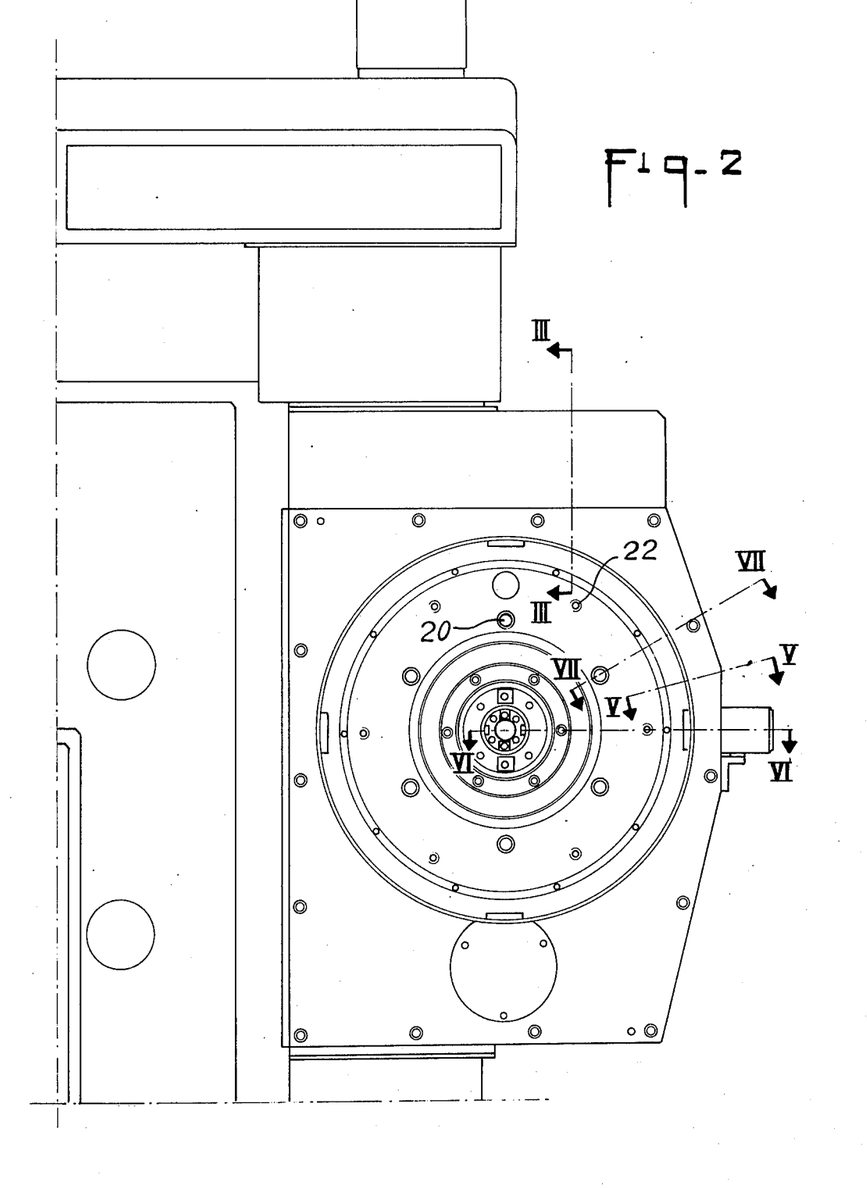
FIG. 2 is a front view looking along arrow II of FIG. 1.

In this way there are two ranges of speed available at which ring 11 may be driven, that is to say it may be driven at high speed for milling, boring and surfacing purposes from the drive-motor for the spindles or at low speed for indexing purposes from the reduction motor 14. On its front face the ring 11 has a centering member 21 and internally threaded holes 22 which enable various fittings such as a surfacing plate and machining heads to be attached. When the ring 11 is used for indexing, it is pressed and held against the body 73 of the head stock by four hydraulic clamping means which are spaced apart from one another at angles of 90°.(FIG. 1a).

Each clamping means consists of a cylinder 29 which is attached to the body 73 of the headstock by screws, (not visible), the cylinder 29 enclosing a sliding piston 27 which is fitted with a gland seal 28. The piston 27 has a rod 24 one end of which is fitted with a collar 25 which is locked in place by a nut 26 and which is located in a circular groove 23 which is T-shaped in cross-section and which is machined in the rear face of ring 11.

Oil under pressure is admitted into an annular space 30 in the cylinder 29 via holes 31 and 32 which are connected by a duct to a high-pressure pump (not shown). Leakage of oil along the rod 24 is prevented by a gland seal 32a. On the opposite face from rod 24, piston 27 has a rod 85 which fits into a stack of elastic or resilient washers 33 which are interposed between the piston 21 and the boty 73 of the head-stock, there being an adjusting washer 34 inserted between the body 73 and the stack of washers 33.

To clamp the ring 11 to the body 73, pressurised fluid is admitted into the annular space 30 in the cylinder so as to thrust the piston 27 and the rod 24 in the direction of an arrow F in opposition to the force exerted by the elastic washers 33. When this movement takes place, the rod 24 acts on the collar 25, the faces 34a of which press the ring 11 against faces 35 and 36 of cylinder 29.

To unclamp the ring 11, the pressure of the fluid in the space 30 is reduced, with the result that the elastic washers 33 which had been compressed now expand and thrust the piston and its collar 25 back to its original position. The collar then leaves a clearance of 0.5 to 1mm between its contact faces 34a and the ring. The ring is thus free to turn.

When turning, the ring 11 remains in contact with faces 35 and 36. Pressure lubrication is provided by wells 37a and 37b which are connected via a common passage and a duct 38 to the head-stock's lubrication circuit.

Figure 5:
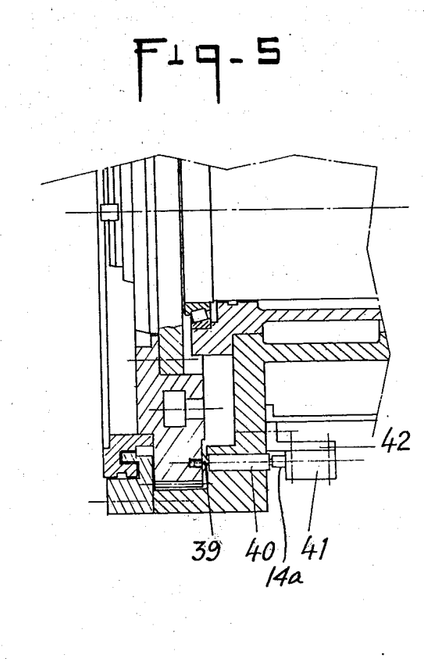
FIG. 5 is a sectional view taken along line V—V of FIG. 2.

In FIG. 5 is shown a means of stopping the ring 11 automatically at positions spaced 90° apart. To this end four projections or pips 39 of suitable shape are attached to the rear face of the ring at positions spaced 90° apart. When the ring is turning, each of the pips comes into a position in which it is located opposite a plunger 40 which is mounted to slide in a bore in the body 73 and which co-operates with a plunger 41a of a switch 41 which is attached to the body 73 by means of an angle-bracket 42. Pips 39 act on the switch 41 via the plunger 40 in such a way that the switch contacts cause the reduction motor 1 to slow to its lowest speed and then to stop with precision.

Figure 6:
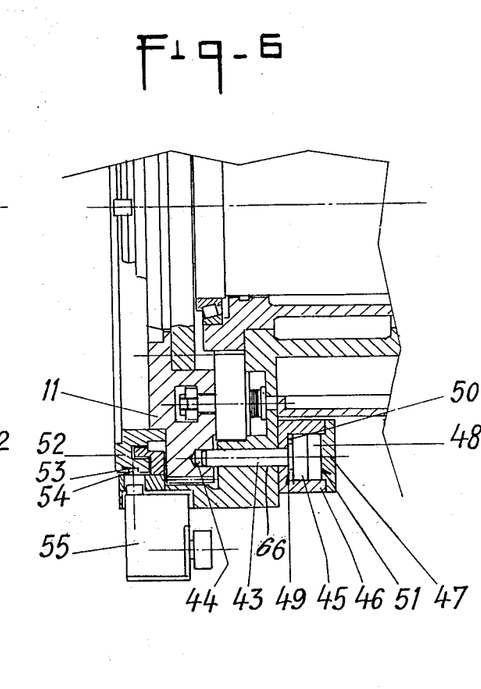
FIG. 6 is a sectional view taken along line VI—VI of FIG. 2.

In FIG. 6 is shown a bolt for providing a location at positions spaced apart by angles of 90° which enable the efficiency, i.e. accuracy of the automatic stopping means to be checked.

To this end, the body 73 contains a bore 66 in which a bolt is mounted to slide. The bolt is formed by a rod 43 one end of which is connected to a piston 45 which moves in a cylinder 46 which is sealed by a cap 47. The other end of the bolt or rod 43 is capable of engaging in appropriate recesses 44 provided in the rear face of the ring 11 which are spaced 90° apart.

Locking is effected by admitting fluid under pressure into an annular space 48, so that the piston 45 will shift and come up against face 49 of the cylinder and the rod or bolt 43 will engage in one of the recesses.

Unlocking results from admitting fluid under pressure to annular space 50, so that the piston 45 will move in the opposite direction until it comes up against a face 51 of a cap 47 and rod or bolt 43 is clear of recess 44.

Locking is controlled by a stopping-contact box. Unlocking is controlled from the control position of the machine, from where the rotation of the ring 11 is initiated also. An electrical safety device prevents the ring 11 from being started up or driven if it is in the locked position.

In FIG. 6 is also shown an optical means of indexing to any angle, which consists of an annular part 52 attached to the ring 11 which contains a groove 54 in which is arranged a strip 53 bearing a finely cut scale of angular markings.

A dial 55 on the body of the head stock enables two consecutive divisions to be read off and gives the angular value in degrees, minutes and seconds.

Figure 7:
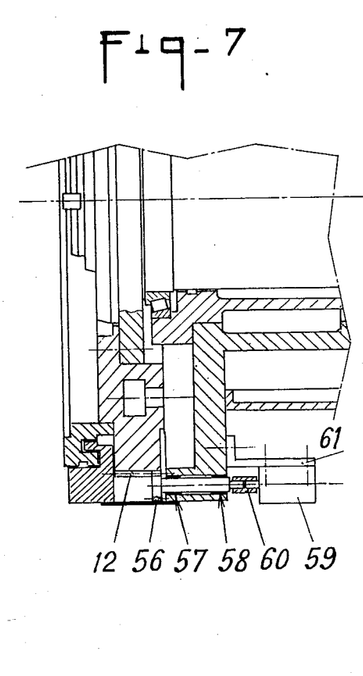
FIG. 7 is a partial sectional view taken along line VII—VII of FIG. 2.

In FIG. 7 is shown an electronic sensor assembly which enables angles to be displayed in degrees and 1/1000ths of a degree and which provides automatic display in numerical control.

With this in view, the ring of teeth 12 on the ring mesh with a small shanked pinion 56 which is mounted to turn in bearings 57, 58 fixed in a bore in the body 73. The pinion 56 is coupled by a sleeve 60 to a sensor 59 which is attached to the head-stock body 73 by an angle bracket 61.

The gear ratio and the number of pulses per revolution given by the sensor are such that one pulse equals 1/1000th of a degree.

In FIG. 8 is shown a surfacing plate 61 fitted to the ring 11. The surfacing plate 61 is centred on the ring by the centering member 21 and it is attached by screws 62 which engage in the internally threaded holes 22 in the ring. In this case, the pinion 13 is disengaged and pinions 5 and 19 are engaged with the result that the ring 11 and plate 61 are driven round at high speed by the spindle motor connected to shaft 6.

Figure 9:
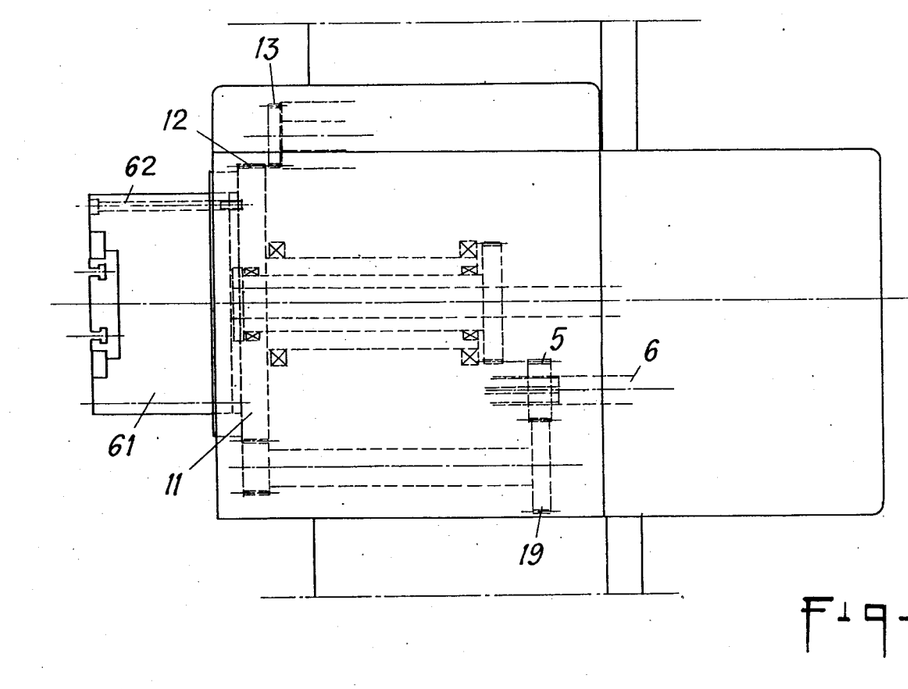
FIG. 9 is an elevation view of the head-stock showing the ring with a twin-output angle-head fitted to it.

In FIG. 9 is shown the way in which the angle-head 63 having the output spindles 64 and 65 is fitted. The angle-head 63 is centred on the ring by the centering member 21 and is attached by screws 66 which engage in the internally threaded holes 22 in ring 11.

The pinion 13 is engaged (in mesh) with the ring of teeth 12 so as to bring the ring 11 to a predetermined indexed position and the pinion 4 is engaged with the pinion 5 to turn the sleeve 2 which is connected to spindles 64 and 65 of head 63. In this case the speed of rotation is that appropriate to the shaft 6 connected to the spindle motor and pinions 5 and 19 are disengaged.

Figure 10:
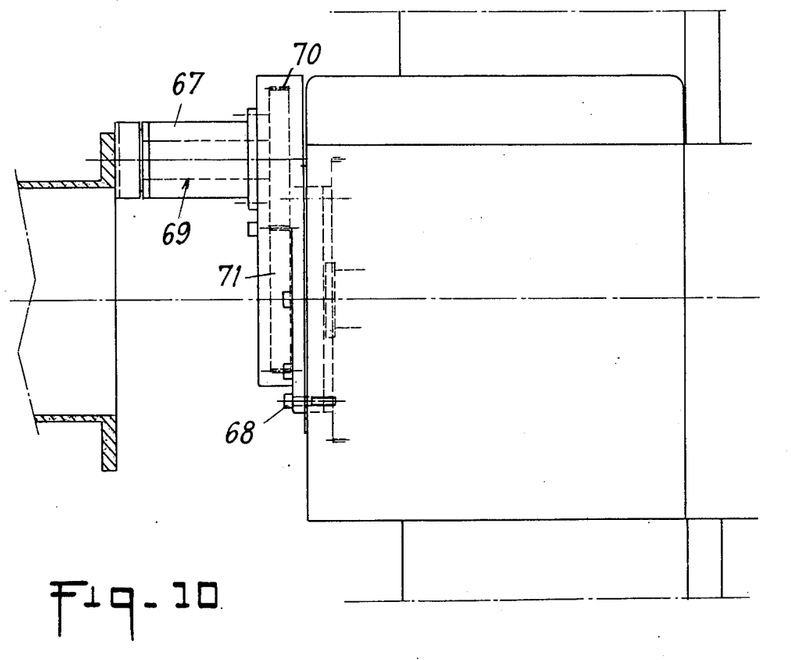
FIG. 10 is an elevation view of the head-stock showing the ring with a spindle-carrier for circular milling fitted to it.
Figure 11:
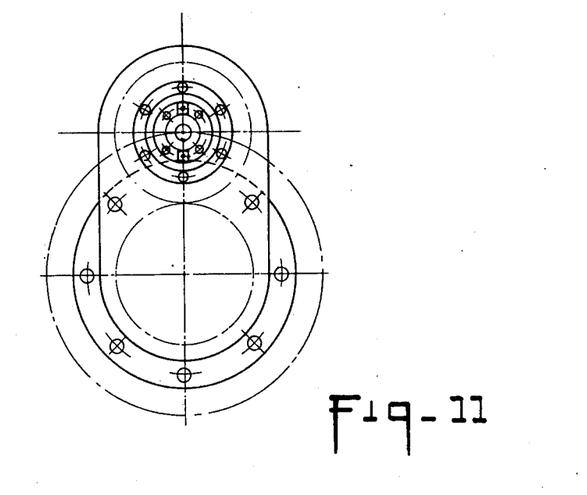
FIG. 11 is a front view of the head-stock shown in FIG. 10.

In FIGS. 10 and 11 is shown the way in which a spindle-carrier 67 is fitted. This is centered on the ring in the same way as the surfacing plate 61 and angle head 68 and is attached by means of screws 68. The transmission to a spindle 69 is via two in-line gears 70 and 71 which are connected to the drive sleeve 2 of the head stock.

In this case the drive pinions are in the same position as in FIG. 9. If the spindle-carrier is used in a fixed position, be it horizontal or vertical, the reach of the machine is increased by twice the radial distance between the axis of the spindle-carrier and the axis of the ring.

Although the embodiment shown is one in which the ring is driven by two separate pinions which are used to provide the drive for machining and indexing respectively, it would equally well be possible to employ an arrangement in which the kinematic train for controlling indexing rotation could be partly shared by the kinematic train for machining rotation and could terminate in a single drive pinion meshing with the ring of teeth 12 on ring 11. Also, the indexing reduction motor 14 would be disengaged when drive was being provided by the motor for the head-stock spindle, i.e. at high speed.

Various modifications may, of course, be made by the man skilled in the art to the methods and arrangements which have just been described, merely as non-limiting examples, without exceeding the scope of the invention.

An improvement in the head-stocks of milling and boring machines characterised in that the ring is provided with centering means and attachment means which enable machining heads or surfacing plates to be fitted to the said ring. An improvement to the head stocks of milling and boring machines characterised in that the ring has a ring of teeth which co-operate selectively with a pinion which is connected by a kinematic train to the drive motor for the spindles or to a disengageable pinion connected to a slow-turning reduction motor unit. An improvement to the headstocks of milling and boring machines characterised in that the ring of teeth on the ring mesh with a pinion which is capable of being connected selectively to the drive motor for the spindles and to a slow-turning reduction motor unit. An improvement to the head-stocks of milling and boring machines characterised in that the reduction motor unit is attached to a sleeve which carries bearings supporting the shaft to which the drive pinion is keyed, the said sleeve being mounted to slide in a holder secured to the body of the head stock and having a rack which is movable by a pinion which is mounted to rotate in the holder.

An improvement to milling and boring machines characterised in that the ring is provided with angularly spaced pips which co-operate via a plunger with a switch attached to the body of the head stock, the said switch controlling the way in which the slow-turning motor stops. An improvement to the head-stocks of milling and boring machines characterised in that between the ring and the body are provided means for clamping the ring in place, said means comprising cylinders secured to the body of the head stock in which move pistons which are subject to the action of a fluid and which act in opposition to elastic or resilient members, the said pistons having rods each of which carries a collar which engages in a groove provided in the rear face of the ring.

An improvement to the head-stocks of milling and boring machines characterised in that the ring is capable of being locked at predetermined angular positions by means which comprise a bolt or rod controlled by a piston which moves under the action of a fluid in a cylinder attached to the body of the head-stock, the said bolt or rod being capable of engaging in holes provided in the rear face of the ring. An improvement to the head-stocks of milling and boring machines characterised in that a small pinion meshes with the ring of teeth on the ring, which operates an electronic sensor which allows the angles to which the ring turns to be displayed and which makes possible automatic division in numerical control. An improvement to the head-stocks of milling and boring machines characterised in that the ring has an annular part fixed thereto and provided with a strip bearing angle markings which can be read by means of a dial fitted to the body of the head stock. An improvement to the head-stocks of milling and boring machines characterised in that the ring is able to be positioned at any desired angle by manually controlled electrical means located at the control position of the machine.

What is claimed is:

1. A head stock for a milling and boring machine, comprising a head-stock body having a front face, a hollow milling spindle mounted for rotation within said body; a boring spindle mounted within said milling spindle for axial sliding movement with respect thereto and for rotation therewith; a tubular member surrounding said milling spindle and mounted in said body for independent rotation about the milling spindle; and a large diameter ring secured to said tubular member adjacent the front face of the body, and common drive means for selectively driving said ring and said milling and boring spindles at high rotational speeds for machining purposes and separate drive means for selectively driving said ring at slow rotational speeds for indexing purposes.

2. A head-stock for a milling and boring machine as defined in claim 1, wherein said ring includes centering and fixing means for securing machining heads and surfacing plates thereon.

3. A head-stock for a milling and boring machine as defined in claim 1, wherein said ring comprises a gear ring having a plurality of peripheral gear teeth; and said common drive means includes a drive motor for said ring and spindles and a kinematic transmission selectively and operatively connecting said drive motor to said ring and milling spindle; said slow drive means including a reduction motor and a selectively disengageable pinion means for selectively drivingly connecting said ring to said reduction motor.

4. A head-stock for a milling and boring machine as defined in claim 3, including a hollow sleeve slidably mounted in said body and having support bearings therein, said reduction motor being secured to said sleeve and having a shaft extending through the sleeve; a drive pinion secured to said shaft, said sleeve being mounted to slide longitudinally in said body and including a rack gear formed on its periphery; and pinion means mounted in said body for selectively moving said sleeve longitudinally, thereby to selectively move said disengageable pinion means into and out of engagement with said ring.

5. A head-stock for a milling and boring machine as defined in claim 3, wherein said ring includes a plurality of angularly spaced pips extending therefrom; switch means fixed to the body of the head-stock and operatively connected to said reduction motor; and means for operatively connecting said switch means to said pip for controlling said switch means to stop the reduction motor when engaged by a pip.

6. A head-stock for a milling and boring machine as defined in claim 1, including, between the ring and the body, means for locking the ring comprising a plurality of hydraulic cylinders secured to the body of the head-stock and having pistons subjected to the opposed action of a fluid and elastic members connected between the piston and the body; said pistons each having a rod including a head; said ring having a groove in its rear face receiving said piston heads.

7. A head-stock for a milling and boring machine as defined in claim 1, including means for locking the ring in predetermined angular positions including a plunger; piston means moving under the action of a fluid in a cylinder fixed to the body of the head-stock for controlling movement of the plunger, said plunger being adapted to be inserted by said piston means in holes provided in the rear face of the ring.

8. A head-stock for a milling and boring machine as defined in claim 3, including a small pinion meshing with the teeth of the ring gear; and electronic sensor means operatively connected to said small pinion for enabling the angles of rotation of the ring to be visualized.

9. A head-stock for a milling and boring machine as defined in claim 1, including an annular member secured to said ring having a circumferential strip mounted thereon, said strip bearing angular indications; and dial means fixed to the body of the head-stock for reading said indications.

* * * * *